UNITED STATES PATENT OFFICE 2,671,108

NITRO DERIVATIVES OF SUBSTITUTED BENZOATES

Arnold N. Johnson, Terre Haute, Ind., assignor to Commercial Solvents Corporation, Terre Haute, Ind., a corporation of Maryland No Drawing. Application February 27, 1952, Serial No. 273,765

6 Claims. (Cl. 260—476)

My invention relates to new compositions of matter, more particularly to the nitro derivatives of substituted benzoates having the general formula:

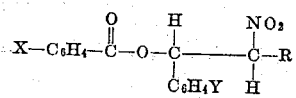

wherein X is selected from the group consisting of hydrogen, chlorine and bromine, Y is selected from the group consisting of hydrogen, methyl, chlorine and bromine and R is selected from the group consisting of methyl and ethyl.

My new compositions of matter are produced by reacting a substituted nitro alcohol with substituted or unsubstituted benzoyl chloride at from 15° C. to 150° C., in a suitable inert solvent, the upper limit of temperature being set by the boiling point of the solvent used for the reaction mixture.

Nitro alcohols which can be used to produce my new compounds are the 2-nitropropanols and 2-nitrobutanols carrying as substituents at the 1 position a phenyl, tolyl, or halogenated phenyl group, such as 1-phenyl-2-nitro-1-butanol, 1-p-chlorophenyl - 2 - nitro - 1 - butanol, 1 - p-tolyl - 2 - nitro - 1 - butanol, 1 - p - chlorophenyl - 2 - nitro - 1 - propanol, 1 - o - chlorophenyl - 2 - nitro - 1 - butanol, 1 - p - bromophenyl - 2 - nitro - 1 - butanol, 1 - o - bromophenyl - 2 - nitro - 1 - butanol, 1 - p - bromophenyl - 2 - nitro - 1 - propanol, and 1 - o - bromophenyl - 2 - nitro - 1 - propanol. The benzoates can be formed by reacting benzoyl chloride or a halogen substituted benzoyl chloride such as chlorobenzoyl chloride or bromobenzoyl chloride with the desired substituted nitro alcohol. Examples of benzoates thus formed are: 1-phenyl-2-nitrobutyl p-chlorobenzoate, 1-phenyl-2-nitrobutyl o-chlorobenzoate, 1-p-chlorophenyl-2-nitrobutyl o-chlorobenzoate, 1-p-chlorophenyl-2-nitrobutyl p-chlorobenzoate, 1-p-tolyl-2-nitrobutyl benzoate, 1-p-chlorophenyl-2-nitropropyl benzoate, 1 - p - bromophenyl - 2 - nitrobutyl p - bromobenzoate, 1 - p - bromophenyl - 2 - nitropropyl o - bromobenzoate, 1 - p - bromophenyl - 2 - nitrobutyl o - chlorobenzoate, 1-p - bromophenyl - 2 - nitropropyl p - chlorobenzoate, etc. Pyridine or other basic diluents such as quinoline may be used as solvents and reagents to take up the hydrogen chloride formed, or an inert solvent such as benzene, cyclohexane, or n-heptane may be used and the hydrogen chloride evolved vented to the atmosphere or absorbed in a water scrubber.

The several nitro alcohols employed as starting materials can be prepared in the following manner. The 1-phenyl-2-nitro-1-butanol is prepared by agitating a mixture of excess 1-nitropropane and 1 mole of benzaldehyde for 3 hours at from 20 to 50° C. after the slow addition of $\tfrac{1}{10}$ mole of 3.2 normal alcoholic potassium hydroxide. The mixture is then acidified with mineral acid to a pH of about 2. Excess 1-nitropropane is then removed by steam distillation to a vapor temperature of 99° C. at which point the distillate is essentially water. If the pH is much above 2, appreciable benzaldehyde appears in the steam distillate and lowers the yield of 1-phenyl-2-nitro-1-butanol.

The 1 - o and p - chlorophenyl - 2 - nitro-1-butanols, 1-o and p-bromophenyl-2-nitro-1-butanols, and 1-o and p-tolyl-2-nitro-1-butanols are prepared by the same procedure as that outlined above for 1-phenyl-2-nitro-1-butanol except that o or p-chlorobenzaldehyde, o or p-bromobenzaldehyde, and o or p-methylbenzaldehyde (o or p-toluic aldehyde) are substituted for the benzaldehyde utilized in the first step. Likewise the o and p-chlorophenyl-2-nitro-1-propanols and o and p-bromophenyl-2-nitro-1-propanols are prepared by the same procedure except that nitroethane is substituted in place of the 1-nitropropane of the first step.

The following examples are offered to illustrate my invention and it is not intended that my invention be construed as limited to the ratios, amounts or specific compounds shown therein.

Example I

The 1-phenyl-2-nitrobutyl p-chlorobenzoate of my invention was prepared as follows: in 100 ml. of pyridine was mixed 19.5 gm. of 1-phenyl-2-nitro-1-butanol and 19 gm. of p-chlorobenzoyl chloride and the esterification reaction between the nitro alcohol and the p-chlorobenzoyl chloride was allowed to proceed 4 hours at room temperature. Two hundred fifty ml. of water and 100 ml. of 50% acetic acid were then added and the solution decanted from an oil residue. The solution was extracted with 100 ml. chloroform and the extract added to the yellow oil. One hundred ml. of chloroform were added to the oil and extract mixture and said mixture was washed with 50% acetic acid, water, and 5% sodium carbonate and dried with anhydrous sodium sulfate. The mixture was then concentrated to 75 ml. and filtered, discarding the insoluble material. To the filtrate was then added 100 ml. of ligroin, the mixture cooled, and the insoluble precipitate removed by filtration and discarded. The filtrate was concentrated to 40 ml., diluted with 50 ml. of ligroin, filtered cold and the precipitate discarded. The filtrate was again concentrated to 30 ml., 200 ml. of ligroin were added, the mixture heated, filtered hot and cooled to room temperature, whereupon the ester, 1-phenyl-2-nitrobutyl p-chlorobenzoate was precipitated. This precipitate was recrystallized from methanol to yield 3.7 gm. of the p-chlorobenzoate derivative, melting at 102 to 104° C. Analysis showed 4.13% nitrogen and 10.52% chlorine against calculated values of 4.20% nitrogen and 10.63% chlorine. The 3.7 gm. of crystals represented a yield of 11% based on the 19.5 gm. of nitro alcohol.

*Example II*

The 1-p-chlorophenyl-2-nitrobutyl p-chlorobenzoate of my invention was prepared as follows: to 100 ml. of benzene solvent was added 60.0 gm. of 1-p-chlorophenyl-2-nitro-1-butanol, 62.6 gm. of p-chlorobenzoyl chloride, and a 10 mesh lump of charcoal as catalyst. The course of the esterification was followed by absorbing the hydrogen chloride evolved in a water scrubber. At 25.7 hours and at 30 hours 1 ml. of chlorosulfonic acid was added as catalyst. After 45 hours 60 ml. of benzene were added and the mixture refluxed for 3 hours, then filtered. Thereafter the filtrate was steam distilled and 72.5 grams of semisolid were obtained as nonvolatile residue. A 45.3 gm. aliquot of the crude semisolid was recrystallized from 75 ml. of ethyl alcohol and 18.6 gm. of crystals melting at 109° C. were obtained which represented a yield of 31.4% based on the moles of nitro alcohols used. The first crop of crystals on analysis showed 19.29% chlorine and 3.54% nitrogen against the calculated values of 19.3% chlorine and 3.8% nitrogen. A second crop of 0.7 gm. was not analyzed. Evaporation of the ethanol gave a residue of 18.8 gm., which fraction probably contained appreciable amounts of the ester since its analysis showed 20.25% chlorine and 4.01% nitrogen. This residue was not further purified.

The members of this new series of compounds are useful as intermediates in the production of insecticides. The members of the series of compounds are themselves insecticides as shown by the results set forth in the table below.

The table sets forth the results of tests of 1-phenyl-2-nitrobutyl p-chlorobenzoate and 1-p-chlorophenyl-2-nitrobutyl p-chlorobenzoate against Mexican bean beetles. The testing procedure used was substantially as follows: A dust made up of a uniform mixture of the requisite amount of the new compound to give the desired dilution and a solid inert carrier was applied to host plants and the healthy insects then transferred to these plants. At the end of 48 hours the precentage of dead insects was determined and the amounts of the food plants consumed were noted.

TABLE

[10 Mexican bean beetle larvae per dilution.]

| | Percent Dilution | No. Dead (48 hours) | Percent Kill | Amt. Food Consumed |
|---|---|---|---|---|
| Untreated Control | | 0 | 0 | Large. |
| 1-p-chlorophenyl-2-nitrobutyl p-chlorobenzoate | 1 | 10 | 100 | Trace. |
| 1-phenyl-2-nitrobutyl p-chlorobenzoate | 1 | 10 | 100 | Do. |

Now having described my invention what I claim is:

1. The compounds represented by the formula

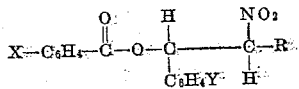

wherein X is selected from the group consisting of hydrogen, chlorine and bromine, Y is selected from the group consisting of hydrogen, methyl, chlorine and bromine, and R is selected from the group consisting of methyl and ethyl.

2. As a new composition of matter the compound 1-phenyl-2-nitrobutyl p-chlorobenzoate.

3. As a new composition of matter the compound 1-p-chlorophenyl-2-nitrobutyl p-chlorobenzoate.

4. As a new composition of matter the compound 1-p-tolyl-2-nitrobutyl benzoate.

5. As a new composition of matter the compound 1-p-chlorophenyl-2-nitropropyl benzoate.

6. As a new composition of matter the compound 1-p-bromophenyl-2-nitrobutyl p-bromobenzoate.

ARNOLD N. JOHNSON.

No references cited.